United States Patent [19]
Edelstein

[11] 4,088,396
[45] May 9, 1978

[54] OPTICAL MOUNT WITH INDEPENDENTLY ORTHOGONALLY ADJUSTABLE ELEMENT

[75] Inventor: Arthur Edelstein, College Point, N.Y.

[73] Assignee: Ardel Kinamatic, College Point, N.Y.

[21] Appl. No.: 719,834

[22] Filed: Sep. 2, 1976

[51] Int. Cl.² .......................... G02B 7/02; F16H 53/02
[52] U.S. Cl. ........................................ 350/252; 74/569
[58] Field of Search ................. 350/252, 257, 247; 354/285–286; 74/567, 569, 501 M; 285/184; 240/DIG. 5, 41.6, 44.1, 151

[56] References Cited

U.S. PATENT DOCUMENTS

1,529,292  3/1925  Benford .............................. 350/252

FOREIGN PATENT DOCUMENTS

63,545    5/1945  Denmark ............................. 350/252
9,328 of  1909    United Kingdom ................. 350/257

OTHER PUBLICATIONS

Dyson, F., "Principles of Mechanism" Oxford U. Press 1951, pp. 321–322, 328.
Lent, D, "Analysis & Design of Mechanisms" Prentice Hall Inc., 1961, pp. 295–297.
Cowie, A., "Kinematics & Design of Mechanisms" Intern. Textbook Co., 1961, pp. 335–341.

Primary Examiner—John K. Corbin
Assistant Examiner—Wm. H. Punter
Attorney, Agent, or Firm—James & Franklin

[57] ABSTRACT

An optical mount enabling independent orthogonal adjustment of the angular position of an optical element comprises a cell adapted to receive an optical element and a base defining a chamber open on one side thereof for receipt of at least a part of the cell therein. The cell comprises a circumferentially extending partial spherical section and a pair of portions extending outwardly of the spherical section, and the base comprises an angular seat on the open side receiving and conforming to at least a portion of the spherical section of the cell and a pair of portions extending outwardly of the seat and facing the cell portions. A pair of independent adjustable means spaced from each other by substantially 90° are secured to one of the portion pairs for movement therewith and have parts adapted to operatively abut against aligned sections of the other of the portion pairs. The parts of the adjustable means and the corresponding aligned sections of the other portion pair are biased towards each other. The cell is pivotable orthogonally about axes passing through the geometric center thereof, without cross-coupling by independent adjustment of the adjustable means.

24 Claims, 12 Drawing Figures

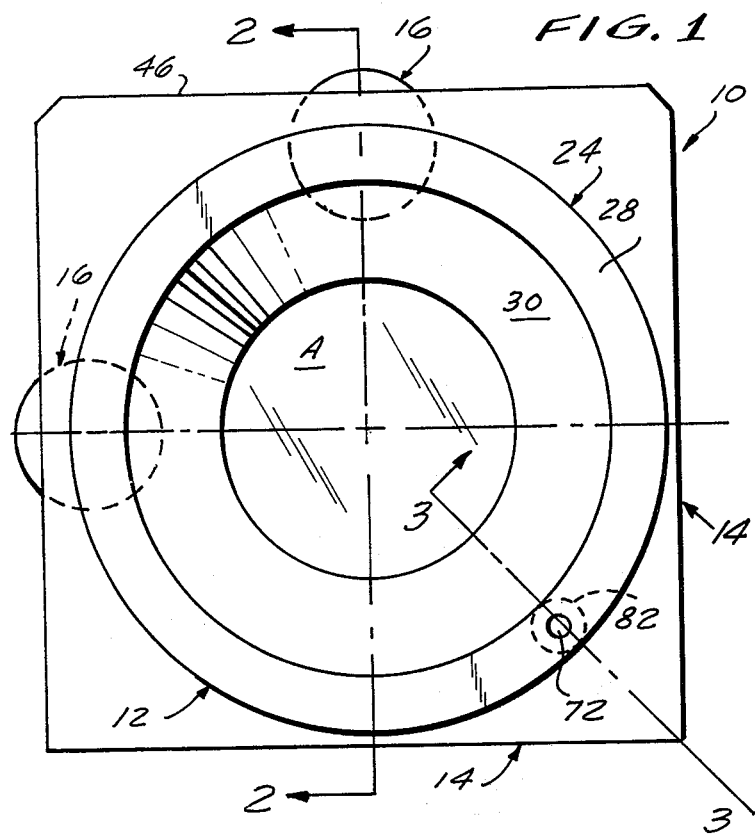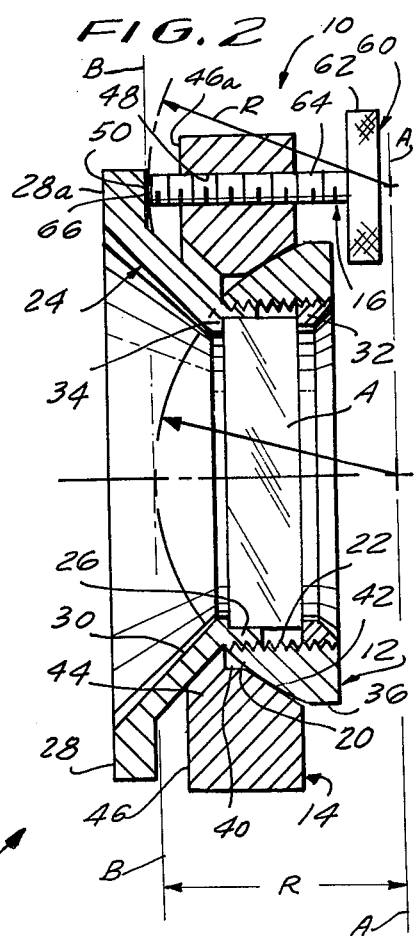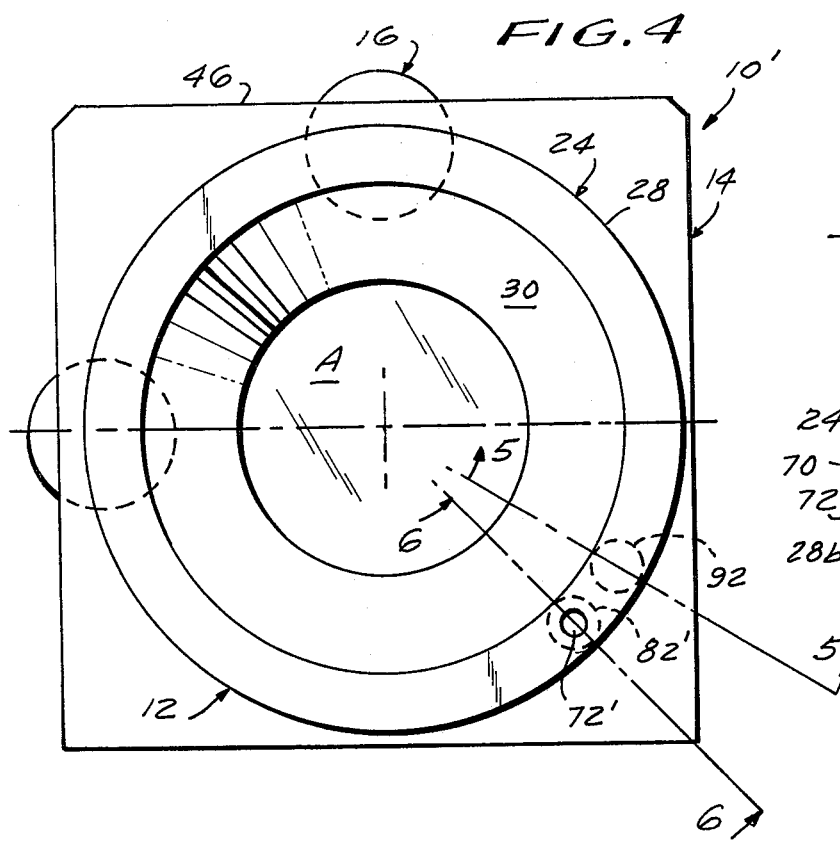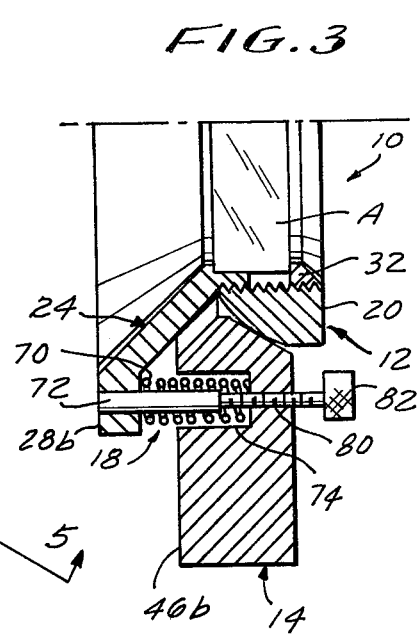

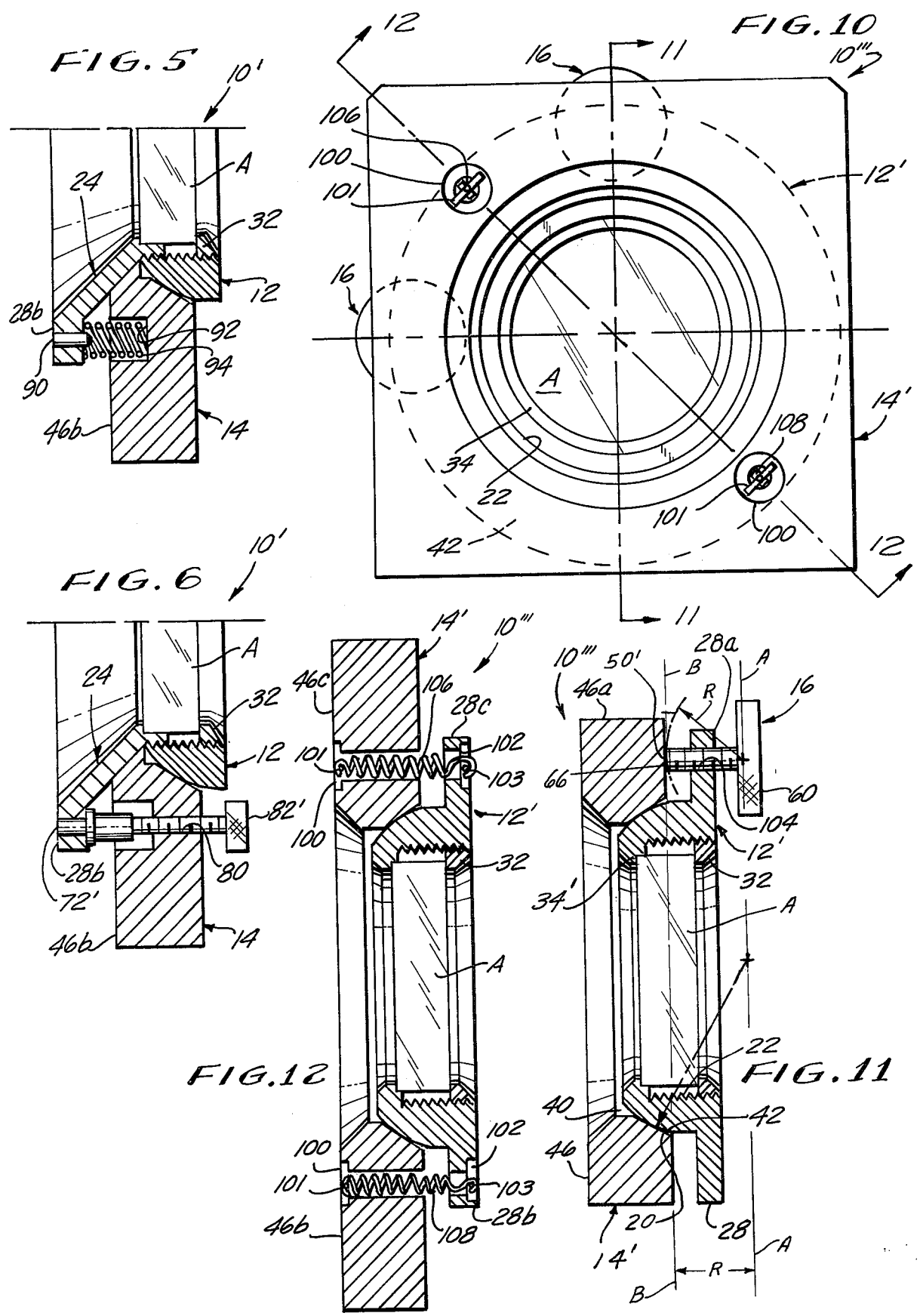

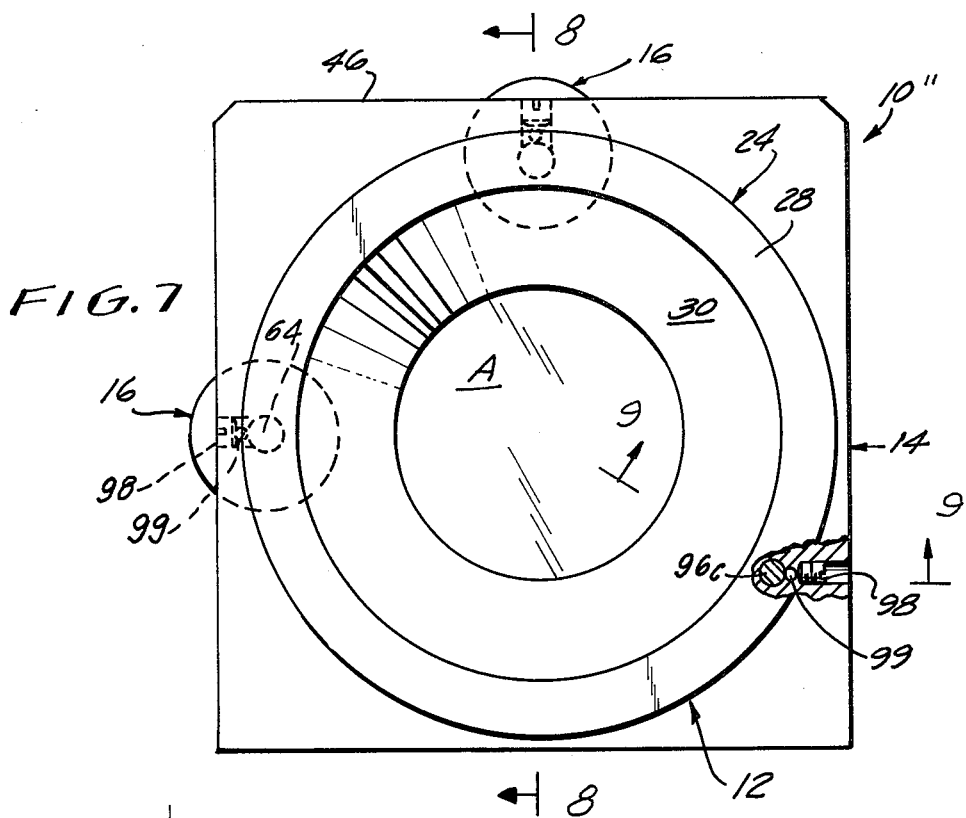
FIG. 7
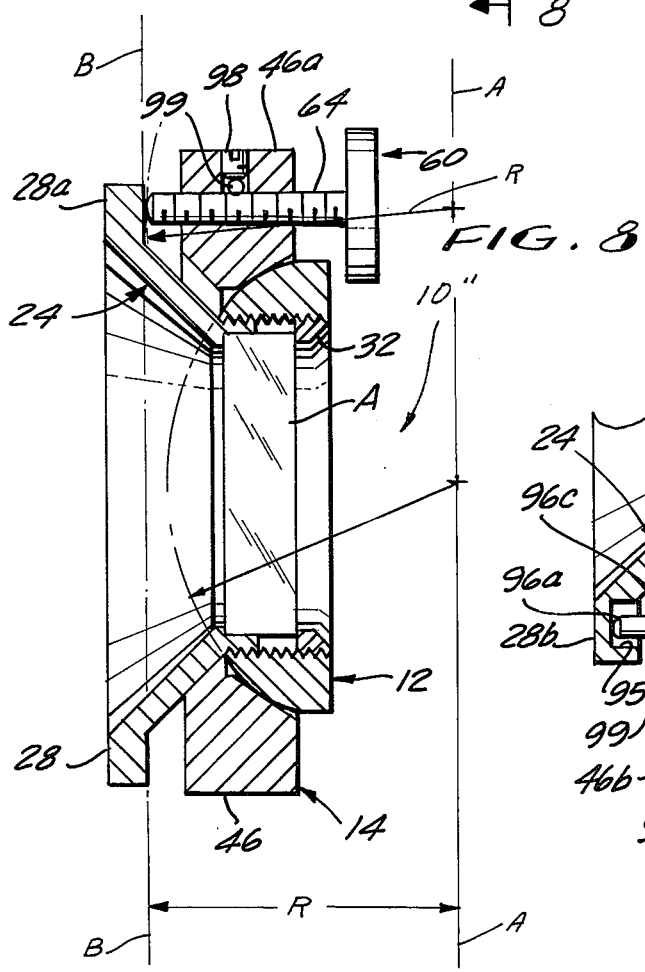
FIG. 8
FIG. 9

OPTICAL MOUNT WITH INDEPENDENTLY ORTHOGONALLY ADJUSTABLE ELEMENT

BACKGROUND OF THE INVENTION

The present invention relates to adjustable mounting means for an optical element, and more particularly to mounting means capable of adjusting the optical element orthogonally about axes passing through the geometric center thereof without cross-coupling.

In a variety of applications, such as laser, image projection and photoelectric systems, it is frequently desirable that optical elements and components be mounted in the system by means that are kinematic, easily adjustable to a desired position, easily lockable in the desired position, mechanically and thermally stable, free of backlash in the adjusting mechanism, and capable of fine incremental changes orthogonally about axes passing through the geometric center thereof without cross-coupling.

To obtain orthogonal adjustability free from cross-coupling, resort is typically had to gimbal mounts in which the optical element is carried by an inner gimbal connected by two bearings along a first axis to an outer gimbal which is in turn connected to a stationary base by means of two more bearings along a second axis perpendicular to the first axis. However, the known gimbal mounts have not proven to be entirely satisfactory for a variety of reasons. The gimbal structure is relatively complex and typically requires the use of at least four small individual pivots or bearings which can develop play or looseness, thereby detracting from the stability of the mount. Typical gimbal construction involves the use of asymmetrically disposed dissimilar materials, thus making the mount more sensitive to thermal effects and reducing thermal stability. Due to the nature of the gimbal mount only one of the adjusting means can be mounted on a fixed and rigid support (namely, the base); the second adjusting member be mounted on the outer gimbal which is a movable part and therefore subject to positional disturbance from hand contact while manual adjustments are being made using the second adjusting member. Finally, most gimbal mounts rely on spring means to maintain the desired positional settings once obtained through adjustment, and cannot be locked to secure the achieved positional setting against subsequent variations due to shock or vibration.

Accordingly, it is an object of the present invention to provide an optical mount enabling independent orthogonal adjustment of the angular position of an optical element without cross-coupling.

It is another object to provide such a mount which does not require the use of any small pivots or bearings.

It is also an object to provide such a mount characterized by a high level of thermal stability.

It is a further object to provide such a mount in which all adjusting means are supported in a rigid fixed support for ease of adjustment and maximum stability during adjustment.

Another object is to provide such a mount which may be locked in its desired setting.

A final object is to provide such a mount which is characterized by a simple, sturdy and inexpensive construction.

SUMMARY OF THE INVENTION

It has now been found that the above and related objects of the present invention are obtained in an optical mount enabling independent orthogonal adjustment of the angular position of an optical element, the mount basically comprising a cell and a base. This cell is adapted to receive an optical element and comprises a circumferentially extending partial spherical section. The base defines a chamber open on one side thereof for receipt for at least a part of the cell therein and comprises a conical seat on the open side receiving and conforming to at least a portion of the spherical section of the cell. Further, the cell includes a pair of portions extending outwardly of the spherical section, and the base defines a pair of portions extending outwardly of the seat and facing the cell portions.

A pair of independently adjustable means spaced from each other by substantially 90° are secured to one of the portion pairs for movement therewith and have parts adapted to operatively abut against aligned sections of the other of the portion pairs. A critical feature is that each of the adjustable means parts has an operative abutment surface which is essentially a partial spherical surface of longitudinal radius R, where R is the spacing between two planes parallel to the plane of the optical element. The first of the two planes passes through the geometric center of the cell partial spherical section and the second of the two planes passes through the points of operative abutment between the adjustable means parts and the aligned sections.

Means are also provided for biasing towards each other the abutting parts of the adjustable means and the corresponding aligned sections of the other portion pair. As a result of this construction, the cell (and hence the optical element) is pivotable orthogonally about axes passing through the geometric center thereof, without cross-coupling, by independent adjustment of the adjustable means.

Preferably one of the portion pairs defines at least a pair of threaded apertures therethrough having centerlines spaced by substantially 90°, and each of the adjustable means comprises a screw means extending through and being in threaded engagement with a respective one of the apertures, the cell being pivotable orthogonally by rotation of the screw means relative to the apertures.

The cell portions may be segments of the flange extending outwardly from the spherical section and the base portions may be segments of a flange extending outwardly from the seat. In this case, the biasing means preferably comprises a spring means secured to and disposed intermediate other segments of the cell and base flanges. Typically, the spring means are disposed generally equidistantly from the adjustable means and adapted to bias the portion pairs towards each other, and hence the adjustable means parts towards the aligned sections.

In a first preferred embodiment, the base and cell portion pairs are the one and other portion pairs, respectively, the cell portion pair being disposed on the side of the base opposite the open side. Where it is desired to be able to lock the cell and base of the first embodiment in a given relative position, the cell and base each additionally comprise mutually facing third portions extending outwardly of the spherical section and the seat, respectively, and being generally equidistantly spaced from the adjustable means on the opposite side of the mount therefrom (so that the two adjustable means for positioning and the third portions are disposed in a Y configuration). In this case, the mount additionally comprises an independently adjustable locking means secured to one of the third portions for movement therewith and having a part adapted to operatively abut an aligned section of the other third portion. Thus, once the cell and base have been properly positioned relative to each other by use of the adjustable means for positioning, the relative position may be fixed by causing the locking means part to abut the other third portion aligned section. Preferably, the locking means comprises a screw means extending through a threaded aperture in one third portion, whereby rotation of the screw means relative to the third portion aperture causes the part thereof to abut the aligned section of the other third portion.

In a second preferred embodiment, the cell and base portion pairs are the one and the other portion pairs, respectively. In this instance, the cell and the base each additionally comprise a pair of mutually facing third portions extending outwardly of the spherical section and the seat, respectively, and being generally equidistantly spaced from the adjustable means on the same side of the mount. The biasing means in this arrangement comprises a first spring means secured to and disposed intermediate the third portions and adapted to bias the third portions together. Preferably, the cell and the base each additionally comprise a pair of mutually facing fourth portions extending outwardly of the spherical section and the seat, respectively, and being generally equidistantly spaced from the adjustable means on the opposite side of the mount. Here, the biasing means also comprises a second spring secured to and disposed intermediate the fourth portions and adapted to bias the fourth portions together, the first spring being of greater tensile strength than the second spring.

It will be noted that while the first preferred embodiment requires that there be available space on both sides of the base (so that the cell portion pairs can extend rearwardly of the base), the second embodiment requires clearance only one side of the base and hence is particularly well adapted for use where the base is to comprise an end of an apparatus (for example, one end of a laser) or sit on a support.

BRIEF DESCRIPTION OF THE DRAWING

FIG. 1 is a rear plan view of a first embodiment of the optical mount of the present invention;

FIG. 2 is a side elevation view, partially in cross-section, taken along the line 2—2 of FIG. 1;

FIG. 3 is a fragmentary side elevation view, partially in cross-section, taken along the line 3—3 of FIG. 1;

FIG. 4 is a rear plan view of a first variation of the first embodiment of the optical mount of the present invention;

FIG. 5 is a fragmentary side elevation view, partially in cross-section, taken along the line 5—5 of FIG. 4;

FIG. 6 is a fragmentary side elevation view, partially in cross-section, taken along the line 6—6 of FIG. 4;

FIG. 7 is a rear elevation view of a second variation of the embodiment of the optical mount of the present invention, with a first portion of the base being removed to reveal details of internal construction;

FIG. 8 is a side elevation view, partially in cross-section, taken along the line 8—8 of FIG. 7;

FIG. 9 is a side elevation view, partially in cross-section, taken along the line 9—9 of FIG. 7;

FIG. 10 is a rear elevation view of a second embodiment of the optical mount of the present invention;

FIG. 11 is a side elevation view, partially in cross-section, taken along the line 11—11 of FIG. 10; and FIG. 12 is a side elevation view, partially in cross-section, taken along the line 12—12 of FIG. 10.

DETAILED DESCRIPTION OF THE PREFERRED EMBODIMENTS

Referring now to the drawings, and in particular to FIGS. 1-3 thereof, therein illustrated is a first embodiment of an optical mount embodying the principles of the present invention. The optical mount is generally designated by the numeral 10 and comprises a movable cell generally designated by the numeral 12, a stationary base generally designated by numeral 14, a pair of independently adjustable means generally designated by the numeral 16, and biasing means generally designated by the numeral 18.

More particularly, the cell 12 comprises a circumferentially extending partial spherical section 20 defining an internally threaded aperture 22 extending through the center thereof. A flange element generally designated by the numeral 24 comprises an inner externally threaded end 26 threadingly engaged and held in place by the rear of the internally threaded cell aperture 22, an outer end 28 extending outwardly of the spherical section 20, and a rearwardly and outwardly extending intermediate portion 30 connecting the inner end 26 and the outer end 28. An externally threaded ring-shaped retaining element 32 is threadingly engaged by the internally threaded cell aperture 22 and serves to maintain an optical element A in a fixed position within the cell with the rear of the optical element A abutting an inwardly extending shoulder 34 of the flange 24 and the front of the optical element A abutting the rear of the retaining element 32. It will be noted that while the circumferentially extending partial spherical section 20 may extend all the way to the front of the cell 12, it is not essential that the forwardmost portion of the cell 12 be an extension of the spherical section 20, and may indeed be truncated as indicated at 36.

The base 14 defines a chamber 40 open at the front side thereof for receipt of at least a part of the cell 12 therein. More particularly, the base 14 comprises a conical seat 42 on the open side receiving and conforming to at least a portion of the spherical section 20 of the cell 12. Thus while the portion of the cell spherical section 20 tangentially contacting the base seat 42 will vary as the spherical section 20 is tilted this way and that within the base seat 42, the same portion of the seat 42 is at all times contacted by the spherical section portion. The rear portion of the base 14 may be beveled outwardly and rearwardly as shown at 44 so as not to interfere with the cell flange intermediate member 30.

The base 14 further comprises an integral flange 46 extending outwardly of the seat 42 and facing the cell flanger outer end 28. A pair of internally threaded apertures 48 extend through the base flange 46, the threaded apertures 48 having centerlines spaced by substantially 90° and aligned with corresponding sections 50 of the cell flange end 28.

At this point, it may be noted that whereas the cell flange 24 and the base flange 46 have been shown and described as extending a full 360° about the spherical section 20, this is not an essential feature of the present invention. Indeed, the cell and base flanges 24, 46 may be discontinuous (i.e., may have segments thereof removed or cut out), the only requirements being that the cell flange 24 define a pair of portions 28a extending outwardly of the cell spherical section 20 and that the base flange 46 define a pair of portions 46a extending outwardly of the base seat 42 and facing the cell portions 28a. Thus, it will be seen that the portion pairs associated with the cell 12 and the base 14 may be portions of a flange extending circumferentially 360°, may be portions of a flange extending less than 360°, or may be separated from one another (for example, as separate lugs extending outwardly from a common surface).

The pair of independently adjustable means 16 comprise a pair of screws generally designated by the numeral 60, each screw 60 comprising a knurled head 62 to facilitate grasping and rotation thereof, an externally threaded body 64 threadingly engaging a corresponding one of the base apertures 48 (so that each base portion 46a and its corresponding screw 60 may be moved together as a unit), and a tip part 66 adapted to operatively abut against an aligned cell section 50. Each screw tip 66 has an end or operative abutment surface which is essentially a partial spherical section of longitudinal radius R, where radius R is equal in length to the spacing between two planes AA and BB, both parallel to the plane of the optical element A. The first plane AA passes through the geometric center of the cell partial spherical section 20 and the second plane passes through the points of operative abutment between the screw tips 66 and the aligned sections 50. It will be noted that the two screw tips 66 act in concert during the adjustment process, the stationary screw tip defining an axis of rotation while the moving screw tip produces the rotation of the cell (and hence the optical element) about the defined axis of rotation. Thus rotation of one screw 60 relative to its base portion 46a in an appropriate direction will cause its tip 66 to displace its corresponding cell portion 28a rearwardly, thereby causing the cell 12 to pivot about an axis passing through the geometric centerline thereof parallel to the plane of the optical element A. Similarly, rotation of the other screw 60 relative to its corresponding base portion 46a in an appropriate direction will cause its tip 66 to displace its corresponding cell portion 28a rearwardly, thereby causing the cell 12 to pivot about another axis passing through the geometric centerline thereof parallel to the plane of the optical element A. As the two screws 60 are spaced from each other by substantially 90°, the cell 12 is thus pivotable orthogonally about transverse axes passing through the geometric center thereof, without cross-coupling, as a result of the independent rotation of screws 60. The fact that both screws 60 are mounted on a fixed and rigid member (i.e., base 14) rather than a movable member (i.e., cell 12) enables one to be used without regard to the possibility of disturbing the cell setting determined by the other.

In order to insure abutment of the cell portions 28a against the screw tips 66, the biasing means 18 comprises a compression spring 70 (see FIG. 3) disposed intermediate the cell flange end 28 and the base flange 46 and adapted to bias the screw tips 66 (and hence the base flange portions 46a) and the corresponding aligned cell sections 50 towards each other. This is accomplished by positioning the spring 70 in a quadrant of the mount diametrically opposed to the quadrant defined by the screws 60, the spring 70 preferably being disposed generally equidistantly from the screws 60. To this end, the cell 12 and the base 14 each additionally comprise mutually facing third portions 28b and 46b, respectively, the portions extending outwardly of the cell spherical section 20 and the base seat 42, respectively, and being generally equidistantly spaced from the screws 60. Where the cell flange end 28 and the base flange 46 extend circumferentially 360°, obviously the third portions 28b and 46b may be segments thereof, as shown.

To assist in maintaining the spring 70 secured to and disposed intermediate to the third portions 28b and 46b, each cell third portion 28b is preferably provided with a forwardly extending lug 72 and the base third portion 46b is preferably provided with a rearwardly opening recess 74. The lug 72 is aligned with and extends partially into the recess 74, the recess 74 being of slightly greater diameter than the lug 72. The spring 70 has one end fit over the lug 72 and the other end disposed in the recess 74, the lug 72 and recess 74 cooperating to maintain the spring 70 in a plane generally transverse to the plane of the optical element A.

Once the cell 12 and the base 14 have been properly positioned relative to each other by use of the independent adjustable means 16, the biasing means 18 will tend to fix the relative position by maintaining the cell portions 28a abutting against the screw tips 66. However, the force exerted by the spring may be overcome on a momentary basis by vibration, shock and the like. Accordingly, it is desirable to provide the base third portion 46b with an internally threaded aperture 80 extending therethrough and aligned with the lug 72. A lock screw 82 may be secured to the base third portion 46b in threaded engagement with the threaded aperture 80 thereof, the tip part of the lock screw 82 being adapted to operative abut an aligned section of the cell third portion 28b, namely, the forward tip of lug 72. Then, once proper positioning of the cell and base relative to one another has been achieved through use of the adjustable means, the screw 82 is rotated in appropriate direction until the tip thereof just abuts the lug 72. In this position the lock screw 82 assumes the function previously performed by spring 70, and does so in a manner which better resists loss of the desired relative positioning through the effects of vibration and shock. (On the other hand, if the screw 82 is rotated too far, the relative positioning of cell 12 and base 14 may be altered or, at the least, stress is created in the cell 12 and base 14, thus impairing the kinematic nature of the mount.)

Referring now to FIGS. 4-6, therein illustrated is a first variation of the first embodiment wherein the locking means 82 and the biasing means 18 are not axially aligned as shown in FIGS. 1 and 3 and described above, but rather slightly spaced from one another to facilitate the operation of each. In this variation, the mount 10' still employs an internally threaded aperture 80 disposed generally equidistantly from the screws 60 and a lug 72' secured to the cell third portion 28b, the forwardly extending portion of the lug 72' preferably being of greater diameter than the forwardly extending portion of lug 72. Lock screw 82' is secured to and in threaded engagement with internally threaded aperture 80, the threaded portion and tip of screw 82' being of somewhat greater diameter than the corresponding portions of lock screw 82, thus insuring more effective abutment of the rearwardly extending tip of lock screw 82' against the forwardly extending surface of lug 72'.

The biasing of the cell 12 relative to base 14 is effected by means of a lug 90 projecting forwardly from the cell third portion 28b, a rearwardly opening recess 92 in the base third portion 46b, and a spring 94 having one end secured in the recess 92 and the other end disposed about the projecting portion of lug 90. The lug 90, recess 92, and spring 94 are all disposed in the same quadrant as the lock screw 82', preferably closely adjacent thereto, while still being spaced therefrom. Inasmuch as the lock screw 82' exerts a positive force to separate the cell and base third portions 28b, 46b and the spring 94 exerts only a biasing force, it is preferred that the lock screw 82' rather than the spring 94 intercept the mount diameter bisecting the angle between screws 60. Obviously the lug 90 and recess 92 need not be associated with the cell and base third portions 28b, 46b, but may be associated with distinct and separate fourth portions in the same quadrant.

Operation of the first embodiment and the first variation thereof is the same. The locking means 82, 82' is rotated so as to cause the rearward tip thereof to retreat from abutment with the forward tip of lug 72, 72', thus freeing the cell 12 for movement relative to base 14. Screws 60 are then rotated independently to provide the desired orthogonal adjustment of cell 12 relative to base 14, and thus the proper orientation of the optical element A. Rotation of the screw 60 in one direction causes rearward travel of the corresponding cell portion 28a, while rotation of the same screw 60 in the opposite direction causes forward travel of the same cell portion 28a under the influence of spring 70, 94 which tends to maintain the cell portions 28a in contact with the screws 60. Once the desired relative positioning of cell 12 and base 14 is effected, the lock screw 82, 82' is rotated in a direction opposite to that of its initial rotation, thereby causing its rearward tip to abut against the forward surface of the lug 72, 72', thereby fixing the relative positioning against unintended displacement by time, vibration and shock.

If desired, the optical element A may be replaced by unthreading retaining ring 32 from the threaded aperture 22, replacing optical element A, and threading retaining ring 32 back into threaded aperture 22. Furthermore, to facilitate insertion and removal of the cell 12 from the base 14, the flange element 24 is readily separably connected to the spherical section 20 by means of the external thread of flange end 26 and the internal thread of spherical aperture 22. Once flange element 24 is separated from cell section 20, the cell 12 is easily removed from base 14.

Referring now to FIGS. 7 – 9, therein illustrated is a second variation of the first embodiment which utilizes setscrew locking means operating directly on the independent adjustable means 16 and the biasing means 18. In this embodiment 10" the cell third portion 28b and base third portion 46b defined mutually facing recesses 95, 95', respectively. A plunger generally designated by the numeral 96 comprises an axially extending body having a tip 96a adapted to enter cell recess 95, a rear portion 96b which extends forwardly of base 14 through an aperture in the base of recess 95' and an intermediate portion 96c which is of enlarged diameter and engages the sides of the base recess 95'. A compression spring 97 is secured between the front of the enlarged intermediate section 96c and the rear of the base recess 95'. The spring 97 acts to bias the plunger 96 rearwardly so that the plunger tip 96a is constantly bearing against cell recess 95 and thus forcing the engagement of the cell portion pairs 28a and the screw tips 66.

To enable locking of the relative positioning of cell 12 and base 14, there is provided adjacent to the threaded body 64 of each screw 60 and the enlarged portion 96c of plunger 96 an internally threaded aperture accessible from an edge or side of the base 14. Seated and threadingly engaged within each of these apertures is a setscrew 98 having a slotted head accessible from the edge or side of the base 14 and an inwardly extending tip adapted to operatively bear inwardly against the threaded bodies 64 or enlarged portion 96c by the hard metal tip of setscrew 98, a small plastic pellet such as nylon ball 99 is preferably disposed intermediate each setscrew tip and its associated threaded body or enlarged portion, so that the setscrews 98 act on the threaded bodies 64 or enlarged portion 96c through the plastic pellets 99.

Operation of this second variation of the first embodiment is substantially similar to operation of the first embodiment and the first variation thereof except that the cell 12 and base 14 are unlocked from their initial relative positioning by rotation of setscrews 98 in such manner as to cause their outward retreat from the threaded bodies 64 or enlarged portion 96c. Once the desired relative positioning of cell 12 and base 14 has been effected utilizing screws 60, as described above, the setscrews 98 adjacent the threaded bodies 64 are rotated in a direction opposite that of their initial rotation, thereby causing their rearward tips to press the associated pellets 99 inwardly against the threaded bodies 64, and hold the threaded bodies 64 against accidental disturbance. The final step in fixing the relative positioning of cell 12 and base 14 is rotation of the setscrew 98 adjacent the enlarged portion 96c in a direction opposite that of its initial rotation, thereby causing its tip to press the associated pellet 99 inwardly against the enlarged portion 96c and hold the relative position of plunger 96. The prime advantage of this variation of the first embodiment is that during the locking process the setscrews 98 are effectively transverse to the adjustable means 16 and biasing means 18. As they are not forcing the cell portions 28a against screw tips 66, there is no possibility of the relative positioning of the cell and base being disturbed during the locking process. Further advantages of this variation of the first embodiment are the stability afforded by a stabilization of the screws 60 against accidental rotation and the additional security of a three-point locking mechanism.

It will be noted that in the first embodiment of the present invention the cell portion pair 28a (and indeed the cell third portion 28b) is disposed on a side of base 14 opposite the open side thereof (that is, opposite the side defining seat 42) and opposite the screw heads 62. It will thus be appreciated that a certain amount of clearance both forwardly and rearwardly of the base 14 is required to enable free motion of cell 12 during the adjustment procedure.

Referring now to FIGS. 10–12 therein illustrated is a second embodiment of the present invention adapted for use in a situation where clearance to one side of the base is either limited or non-existent, for example, because the mount is to be supported vertically on a table by the base. Whereas in the first embodiment the adjusting means 16 are in threaded engagement with the base and operate by abutting the cell portion pairs, in the second embodiment the adjusting means are in threaded engagement with the cell and operate by abutting the base portion pair.

More particularly, in the second embodiment optical mount 10''' comprises a base 14' defining a chamber 40, a seat 42, a pair of portions 46a and a third portion 46b, all essentially as described in connection with base 14. In the instance where the base portions 46a, 46b are not part of a continuous flange 46, a fourth portion 46c is provided intermediate portions 46a. Base portions 46a are preferably imperforate (i.e., contain no counterpart to threaded apertures 48); on the other hand, base portions 46b and 46c each define an aperture 100 extending therethrough, the rear of each aperture 100 being equipped with means 101 to engage a spring end.

Cell 12' comprises a circumferentially extending partial spherical portion 20, an internally threaded aperture 22 and an externally threaded retaining ring 32. The rear portion of the spherical section 20 defines inwardly extending shoulder 34' which cooperates with the retaining ring 32 to maintain an optical element A in position within the cell 12'. The front section of cell 12' defines a pair of cell portions 28a and a third cell portion 28b, cell portions 28a and 28b being aligned with base portions 46a and 46b, respectively. If the cell portions 28a, 28b are not part of a continuous flange 28, a fourth cell portion 28c aligned with base fourth portion 46c is provided. Cell portions 28a each define an internally threaded aperture 104 extending therethrough and aligned with a section 50' of the corresponding base portions 46a. Cell portions 28b and 28c each define apertures 102 extending therethrough, the front of each aperture 102 being equipped with means 103 to engage a spring end. (It will be noted that the cell portions 28a, 28b, 28c are of one-piece integral construction with the cell spherical section 20, a feature which provides additional strength to the cell structure and reduces its production costs, this feature being made possible by the fact that the cell portions 28 are disposed on the open or seat side of the base 14'.)

The pair of independently adjustable means 16 are the same as in the first embodiment, but extend through and are in threaded engagement with cell apertures 104 and abut against aligned sections 50' of the base portions 46a (rather than passing through and being in threaded engagement with base threaded apertures 48 and abutting against aligned sections 50 of the cell portions 28a). As a result, rotation of screw 60 cause an adjustment of the orientation of the cell 12' along an axis thereof by virtue of the threaded engagement between the cell portion 28a and the screw 60 so that the screw 60 does not travel axially (rather than by virtue of an abutment of the screw tip 66 against the cell portion 28a which is dependent upon an axial travel of the screw 60). The screws 60 are again each provided with tips 66 having a longitudinal radius R as previously defined.

In order to insure continuous contact of screw tips 66 with base portions 46a and continuous seating of cell 12' in base 14', the biasing means in this embodiment comprise extension springs 106 and 108. Spring 106 has its ends secured to the connecting means 101 and 103 disposed in aperture 100 of base portion 46c and aperture 102 of cell portion 28c, respectively, and spring 108 has its ends secured to the connecting means 101 and 103 disposed in aperture 100 of base portion 46b and aperture 102 of cell portion 28b, respectively. It is essential that spring 106 disposed intermediate screws 60 be of greater strength (i.e., exert greater tensile force) than spring 108 disposed in the opposite quadrant, the presence of spring 108 nevertheless being desirable as a balancing factor.

Operation of the mount 10''' of the second embodiment is essentially the same as the operation of the mounts of first embodiment from the point of view of the user, although the principles of operation differ considerably. Once the proper optical element A has been inserted and retaining ring 32 rotated to secure the optical element A between itself and shoulder 34', the screws 60 are rotated in one direction or the other as desired to cause the cell 12' to assume the proper relative orientation with respect to base 14'. While the point of contact between tip 66 and aligned surface 50' will vary as the screw 60 is rotated and the cell 12' is reoriented, the biasing means comprised of springs 106 and 108 will insure a continued contact between the tips 66 and the base portions 46a (and indeed, more basically, insure a continued seating of cell 12' in base 14').

The mount of the present invention is characterized by a high level of thermal stability due to the symmetrical disposition of the three position determining members (the two adjusting means 60 and the locking means 82 or 96), which are preferably formed of steel, in an otherwise essentially single metal construction, the preferred metal being aluminum. The stresses due to thermal expansion after the desired setting has been achieved are evenly applied and self-cancelling.

In effect the present invention utilizes the entire cell as a single large bearing and the base as a single large bearing seat, thus providing a simple, sturdy and inexpensive mount construction. The problems of play and looseness inherent in the use of a plurality of small pivots or bearings is totally avoided. Adjustability of the optical element is facilitated by placement of both adjusting screws on the rigid and fixed base, as the base is not subject to disturbance by hand or finger motion during the adjustment procedure. Finally, it will be noted that the first embodiment enables the mount to be locked in a given setting and the second variation of the first embodiment enables locking in a desired setting to be achieved without any danger of disturbing the setting, thus simplifying and speeding up the locking procedure.

Now that the preferred embodiments of the present invention have been shown and described in detail, various modifications and improvements thereon will become readily apparent to those skilled in the art. Accordingly, the spirit and scope of the present invention is to be defined only by the appended claims, and not by the foregoing disclosure.

I claim:

1. An optical mount enabling independent orthogonal adjustment of the angular position of an optical element comprising
   A. a cell adapted to receive an optical element and comprising a circumferentially extending partial spherical section and a pair of portions extending outwardly of said cell spherical section;
   B. a base defining a chamber open on one side thereof for receipt of at least a part of said cell therein and comprising a conical seat on said open side receiving and conforming to at least a portion of said cell spherical section and a pair of portions extending outwardly of said seat and facing said cell portions;
   C. a pair of independently adjustable means spaced from each other by substantially 90°, secured to one of said portion pairs for movement therewith, and having parts adapted to operatively abut against aligned sections of the other of said portion pairs, each of said adjustable means parts having an operative abutment surface which is essentially a partial spherical surface of longitudinal radius R, where R is the spacing between two planes parallel to the plane of the optical element, the first of said two planes passing through the points of operative abutment between said adjustable means parts and said aligned sections and the second of said two planes passing through the geometric center of said cell spherical section; and D. means for biasing towards each other said parts of said adjustable means and said corresponding aligned sections of said other portion pair;

whereby said cell is pivotable orthogonally about axes passing through the geometric center thereof, without cross-coupling, by independent adjustment of said adjustable means.

2. The mount of claim 1 wherein one of said portion pairs defines at least a pair of threaded apertures therethrough having centerlines spaced by substantially 90°, and wherein each of said adjustable means comprise a screw means extending through and being in threaded engagement with a respective one of said apertures, said cell being pivotable orthogonally by rotation of said screw means relative to said apertures.

3. The mount of claim 1 wherein said cell portions are segments of a flange extending outwardly from said spherical section and said base portions are segments of a flange extending outwardly from said seat.

4. The mount of claim 3 wherein said biasing means comprises spring means connecting other segments of said cell and base flanges.

5. The mount of claim 1 wherein said biasing means comprises spring means disposed generally equidistantly from said adjustable means and adapted to bias said portion pairs toward each other, and hence said adjustable means parts towards said aligned sections.

6. The mount of claim 5 wherein said cell and said base each additionally comprise mutual facing third portions extending outwardly of said spherical section and said seat, respectively, and being generally equidistantly spaced from said adjustable means; and wherein said spring means is secured to and disposed intermediate said third portions.

7. The mount of claim 6 wherein said base and cell portion pairs are said one and other portion pairs, respectively.

8. The mount of claim 1 wherein said base and cell portion pairs are said one and other portion pairs, respectively.

9. The mount of claim 8 wherein said cell and said base each additionally comprise mutually facing third portions extending outwardly of said spherical section and seat, respectively, and being generally equidistantly spaced from said adjustable means in a diagonally opposed quadrant of said mount therefrom, and wherein said mount additionally comprises an independently adjustable locking means secured to said base third portion for movement therewith and having a part adapted to operatively abut an aligned section of said cell third portion; whereby, once said cell and said base have been properly positioned relative to each other by adjustment of said adjustable means, such relative position may be fixed by causing said locking means part to abut said cell third portion aligned section.

10. The mount of claim 9 wherein said base third portion defines a threaded aperture therethrough, and said locking means comprise a screw means extending through said third portion aperture, whereby rotation of said screw means relative to said third portion aperture causes said part thereof to abut said cell third portion aligned section.

11. The mount of claim 8 wherein said cell portion pair is disposed on a side of said base opposite said open side.

12. The mount of claim 8 additionally including three independently adjustable locking means associated with and extending generally transverse to said pair of adjustable means and said biasing means, respectively, each of said locking means being in threaded engagement with said base and having a portion adapted for operative engagement with a respective associated one of said adjustable means or biasing means, thereby to fix the positioning of said adjustable means or biasing means relative to said base.

13. The mount of claim 1 wherein said cell and base portion pairs are said one and other portion pairs, respectively.

14. The mount of claim 13 wherein said cell and said base each additionally comprise third mutually facing portions extending outwardly of said spherical section and said seat, respectively, and being generally equidistantly spaced from said adjustable means and in the same quadrant of said mount, and wherein said biasing means comprises a first spring means secured to and disposed intermediate said third portions and adapted to bias said third portions together.

15. The mount of claim 13 wherein said spherical section and said cell portions are of one piece integral construction.

16. The mount of claim 2 wherein said spherical section and said cell portions are of one piece integral construction.

17. The mount of claim 8 wherein said spherical section and said cell portions are of one piece integral construction.

18. The mount of claim 13 wherein said spherical section and said cell portions are of one piece integral construction and said base conical seat and said base portions are of one piece integral construction.

19. The mount of claim 1 wherein said adjustable means is rotatable about an axis relative to said base, said rotation of said adjustable means causing travel of said adjustable means along said axis relative to said base portion pairs.

20. The mount of claim 8 wherein said adjustable means is rotatable about an axis relative to said base, said rotation of said adjustable means causing travel of said adjustable means along said axis relative to said base portion pairs.

21. The mount of claim 1 wherein said adjustable means is rotatable about an axis relative to said cell, said rotation of said adjustable means causing travel of said cell portion pair along said axis relative to said adjustable means.

22. The mount of claim 13 wherein said adjustable means is rotatable about an axis relative to said cell, said rotation of said adjustable means causing travel of said cell portion pair along said axis relative to said adjustable means.

23. An optical mount enabling independent orthogonal adjustment of the angular position of an optical element comprising A. a cell adapted to receive an optical element and comprising a circumferentially extending partial spherical section and a pair of portions extending outwardly of said cell spherical section, said cell portion pair being readily separably connected to said spherical section;

B. a base defining a chamber open on one side thereof for receipt of at least a part of said cell therein and comprising a conical seat on said open side receiving and conforming to at least a portion of said cell spherical section and a pair of portions extending outwardly of said seat and facing said cell portions;

C. a pair of independently adjustable means spaced from each other by substantially 90°, secured to said base portion pair for movement therewith, and having parts adapted to operatively abut against aligned sections of said cell portion pair, each of said adjustable means parts having an operative abutment surface which is essentially a partial spherical surface of longitudinal radius R, where R is the spacing between two planes parallel to the plane of the optical element, the first of said two planes passing through the points of operative abutment between said adjustable means parts and said aligned sections and the second of said two planes passing through the geometric center of said cell spherical section; and D. means for biasing towards each other said parts of said adjustable means and said corresponding aligned sections of said cell portion pair;

whereby said cell is pivotable orthogonally about axes passing through the geometric center thereof, without cross-coupling, by independent adjustment of said adjustable means.

24. An optical mount enabling independent orthogonal adjustment of the angular position of an optical element comprising A. a cell adapted to receive an optical element and comprising a circumferentially extending partial spherical section and a pair of portions extending outwardly of said cell spherical section;

B. a base defining a chamber open on one side thereof for receipt of at least a part of said cell therein and comprising a conical seat on said open side receiving and conforming to at least a portion of said cell spherical section and a pair of portions extending outwardly of said seat and facing said cell portions;

C. a pair of independently adjustable means spaced from each other by substantially 90°, secured to said cell portion pair for movement therewith, and having parts adapted to operatively abut against aligned sections of said base portion pair, each of said adjustable means parts having an operative abutment surface which is essentially a partial spherical surface of longitudinal radius R, where R is the spacing between two planes parallel to the plane of the optical element, the first of said two planes passing through the points of operative abutment between said adjustable means parts and said aligned sections and the second of said two planes passing through the geometric center of said cell spherical section; and D. means for biasing towards each other said parts of said adjustable means and said corresponding aligned sections of said base portion pair;

said cell and said base each additionally comprising third and fourth mutually facing portions extending outwardly of said spherical section and said seat, respectively, said third portions being generally equidistantly spaced from said adjustable means and in the same quadrant of said mount and said fourth portions being generally equidistantly spaced from said adjustable means in a diagonally opposed quadrant of said mount, and said biasing means comprising a first spring means secured to and disposed intermediate said third portions and adapted to bias said third portions together and a second spring means secured to and disposed intermediate said fourth portions and adapted to bias said fourth portions together, said first spring means being of greater strength than said second spring means;

whereby said cell is pivotable orthogonally about axes passing through the geometric center thereof, without cross-coupling, by independent adjustment of said adjustable means.

* * * * *